United States Patent [19]

Daniher et al.

[11] B 3,914,303

[45] Oct. 21, 1975

[54] PREPARATION OF N,N-DIALKYLACRYLAMIDES

[75] Inventors: Francis A. Daniher, Alma City, Mich.; Kenneth E. Visek, Stickney, Ill.

[73] Assignee: CPC International Inc., Englewood Cliffs, N.J.

[22] Filed: Sept. 1, 1972

[21] Appl. No.: 285,796

[44] Published under the Trial Voluntary Protest Program on January 28, 1975 as document no. B 285,796.

[52] U.S. Cl. ...... 260/561 N; 260/535 R; 260/561 B
[51] Int. Cl.[2] .................................. C07C 103/30
[58] Field of Search ............... 260/561 N, 561 B

[56] References Cited
UNITED STATES PATENTS

| | | | |
|---|---|---|---|
| 2,128,208 | 8/1938 | Jacobson | 260/49.1 |
| 2,393,000 | 1/1946 | Seeger | 260/464 |
| 2,534,585 | 12/1950 | Erickson | 260/561 N |
| 2,562,583 | 7/1951 | Schulz et al. | 260/465.2 |
| 2,587,209 | 2/1952 | Phillips et al. | 260/561 |
| 3,288,794 | 11/1966 | Kuceski | 260/268 |

OTHER PUBLICATIONS

Chem. Abstracts – 22: 943g
Gordon et al., J.A.C.S., April, 1949, 71, pp. 1245–1250.
McC. Arnett et al., J.A.C.S., Dec. 1950, 72, pp. 5635–5638.
McC. Arnett et al., J.A.C.S., Nov., 1951, 73, pp. 5393–5395.
Ratchford et al., J.A.C.S., Aug., 1947, 69, pp. 1911–1914.

*Primary Examiner*—Lewis Gotts
*Assistant Examiner*—Ethel G. Love
*Attorney, Agent, or Firm*—Albert P. Halluin

[57] ABSTRACT

This invention discloses a process for the preparation of an N-N-dialkylamide of an alpha, beta-olefinically unsaturated monocarboxylic acid by catalytically amidating an ester of a beta-ether substituted carboxylic acid with an N,N-dialkylamine in the presence of a catalyst-solvent consisting essentially of a polyol having at least two vicinal hydroxy groups to produce a reaction product containing an N,N-dialkylamide of a beta-ether substituted carboxylic acid; thereafter, catalytically dealkoxylating said N,N-dialkylamide of the beta-ether substituted carboxylic acid in the vapor phase at a temperature of from about 300°C to about 500°C in the presence of a solid acidic catalyst with the formation of reaction products consisting predominantly of an N,N-dialkylamide of alpha, beta-olefinically unsaturated monocarboxylic acids and an alcohol; removing said reaction products; and recovering a purified N,N-dialkylamide of an alpha, beta-olefinically unsaturated monocarboxylic acid, that is capable of forming homopolymers and copolymers by cationic, anionic and free-radical polymerization.

22 Claims, No Drawings

PREPARATION OF N,N-DIALKYLACRYLAMIDES

BACKGROUND OF THE INVENTION

1. Field of the Invention

This invention relates to a process for the preparation of N,N-dialkylamides of alpha, beta-olefinically unsaturated monocarboxylic acids. More particularly, this invention relates to an improved process for preparing N,N-dialkylamides of alpha, beta-olefinically unsaturated monocarboxylic acids in yields of over 80% and with a purity such that the N,N-dialkylamides of alpha, beta-olefinically unsaturated monocarboxylic acids are capable of forming homopolymers and copolymers by cationic, anionic and free-radical polymerization without the necessity of elaborate purification techniques.

2. Description of the Prior Art

There are a very large number of potential applications for N,N-dialkylamides of alpha, beta-olefinically unsaturated monocarboxylic acids, their homopolymers, copolymers and graft copolymers as exemplified in the literature. These compositions are particularly useful because of their complete substitution on the nitrogen atom of the amide. The fully substituted amides are particularly useful because of their complete substitution on the nitrogen atom which imparts enhanced solvency in solvents and the polymers have enhanced compatibility with other plastics, such as poly(vinyl chloride), polyacrylonitrile, polyurethanes and other hydrophobic polymers. Furthermore, the polymers of the fully substituted amides impart film-forming properties and thermoplasticity to the products.

For example, it is disclosed in U.S. Pat. Nos. 2,951,820 and 2,919,254 that N,N-dimethylacrylamide provides polymers with improved adhesion in coatings and baking enamels, such as the alkyd resins. It is disclosed in U.S. Pat. No. 2,994,676 that aqueous dispersions of polymers using substituted acrylamides can be prepared for use in thermoplastic and thermosetting coating compounds. U.S. Pat. No. 2,976,182 describes the preparation of elastomeric vapor-permeable films and coatings for use in coated fabrics for rainwear, specifically, mentioning the use of N,N-dimethylacrylamide for this application. In U.S. Pat. No. 3,069,264, N,N-dimethylacrylamide copolymers are described as being useful in preparing the chemically stable, photosensitive elements for color diffusion transfer processes. These copolymers readily release the color-providing substance, and offer superior wet and dry adhesion when compared with cellulose acetate hydrogen phthalate, which conventionally is used for such purposes. German Pat. No. 1,049,574 discloses that polyester-glass fiber laminates having improved bending strength and better work-ability are obtained by adding substituted acrylamides to the composition. N,N-Dimethylacrylamide has also been described as a composition which improves the dyeability of synthetic fibers. For example, the dye receptivity of cellulose acetate fiber can be substantially improved by co-spinning from a solution a mixture of cellulose acetate and a copolymer of N,N-dimethylacrylamide. U.S. Pat. No. 2,893,970 discloses a process for improving the dyeability of a polyester and a hydrocarbon fiber by co-spinning from the melt a polymer of an acrylamide. Japanese Pat. No. 68 09063 discloses an alternate process for hydrocarbon-type fibers which consists of "building-in" improved dyeability by copolymerizing ethylene or propylene with N,N-dimethylacrylamide. In this same connection, U.S. Pat. No. 2,895,287 discloses the use of these acrylamide polymers for producing bulky rayon yarn and U.S. Pat. No. 2,992,943 and German Pat. No. 1,068,893 describe the use of polymers as warp sizes for polyesters and cellulose ester fibers. Polymers of N,N-dimethylacrylamide have also been described as being useful in hair setting lotions, as anti-static agents, adhesives, thickeners, and binding agents.

Despite the large number of potential applications for the fully substituted acrylamides, such as N,N-dialkylacrylamide and its polymers and copolymers, there is no known available low cost commercial synthesis for these potentially valuable compositions at the present time.

3. Prior Art Preparation of N,N-Dialkylacrylamides

A review of the prior art reveals that N,N-dialkylacrylamides have been prepared by a variety of methods with varying degrees of conversions and yields. U.S. Pat. No. 2,539,473 discloses the preparation of N,N-dimethylacrylamide by a four-step process using lactic acid as the starting material. British Pat. No. 648,886 discloses reacting beta-propiolactone with dimethylamine to produce N,N-dimethylhydracrylamide which is subsequently dehydrated to form the monomer.

There have been proposed several syntheses based on acrylic acid to produce the compound N,N-dimethylacrylamide. For example, the conversion of acrylic acid to the acid chloride, followed by reaction with dimethylamine to produce the monomer is disclosed in *J. Am. Chem. Soc.*, Vol. 69, p. 1911 (1947). U.S. Pat. No. 2,719,177 discloses the catalytic dehydration of dimethyl ammonium acrylate to form N,N-dimethylacrylamide. French Pat. No. 1,426,086 discloses the reaction of acrylic acid with N,N-dimethylcarbamoyl chloride in the presence of a tertiary amine to produce N,N-dimethylacrylamide. U.S. Pat. No. 2,773,063 describes the oxo-amidation of acetylene to produce acrylamide.

Several processes for preparing N,N-dialkylacrylamides from alkyl acrylates have also been proposed. For example, U.S. Pat. Nos. 2,534,585 and 2,702,822 describe that it is known to react alkylamines with beta-alkoxy propionate esters followed by dealkoxylation to form the corresponding amide. The yield for the dealkoxylation reaction described in U.S. Pat. No. 2,534,585 is not given, however, based on calculations it would appear that a yield of less than 52% of the theory was obtained. U.S. Pat. No. 2,702,822 states that while dealcoholysis of beta-alkoxy-substituted carboxylic acid derivatives by means of an acid or surface active catalyst is known, conversions under such conditions are generally very low and the amount of material converted will contain appreciable amounts of undesirable by-products.

The process described in U.S. Pat. No. 2,702,822 is primarily directed to a method for dealkoxylating beta-alkoxy-substituted monocarboxylic acid amides with conversions of up to 90% or more with virtually no by-product formation by the use of a solid inorganic alkaline catalyst at temperatures ranging from about 200°C to about 300°C and at a pressure of no more than about 100 mm. of mercury absolute. The dealkoxylation in the presence of an alkaline catalyst is interesting from a theoritical standpoint. However, it has the disadvantage of causing polymerization of the unsaturated amide at high temperatures. Thus, when the monomer is subjected to high temperatures for a long period of time, the possibility of decomposition and/or polymerization increases. In addition, the presence of an acidic component such as beta-alkoxy propionic acid deactivates the catalyst.

As it can be seen from the above description of the prior art, the methods outlined hereinabove have, therefore, not heretofore been used for industrial synthesis of N,N-dialkylacrylamides.

STATEMENT OF THE INVENTION

The process of the present invention involves the combination of catalytically amidating a beta-ether substituted carboxylic acid ester, followed by catalytically dealkoxylating an N,N-dialkyl beta-ether substituted carboxylic acid amide to obtain high yields and high conversions of the corresponding N,N-dialkylamide of alpha, beta-olefinically unsaturated monocarboxylic acid. The process can be operated on either a batch or continuous basis. The N,N-dialkylamides of the alpha, beta-olefinically unsaturated monocarboxylic acid produced by the process of the invention are capable of forming homopolymers and copolymers by cationic, anionic and free-radical polymerization techniques.

DESCRIPTION OF THE PREFERRED EMBODIMENTS

The process of the present invention comprises amidating a beta-ether substituted carboxylic acid ester with an N,N-dialkylamine in the presence of a polyol having at least two vicinal hydroxy groups at elevated temperatures, followed by catalytically dealkoxylating the beta-ether substituted carboxylic acid amide in the presence of a particulate, acidic catalyst in the vapor phase.

Yields of more than 80% are achieved at high conversions of the starting materials by the new process. The reactions, which hitherto have only been of theoretical interest, thus become interesting industrially and permit commercial use thereof.

The high yields and conversions achieved by the method of the present invention are particularly unexpected in view of the disclosure in U.S. Pat. NO. 2,702,822 which discloses that acidic dealkoxylation results in poor conversions and yields. In addition, the high yields and conversions achieved by the method of the present invention are unexpected in view of the disclosure in U.S. Pat. No. 2,562,583 which discloses the vapor phase reaction of beta-alkoxy propionamides in the presence of acidic silicas produces acrylonitrile.

It has been found that the process of the present invention is specific to the preparation of N,N-dialkylamides of alpha, beta-olefinically unsaturated monocarboxylic acids from beta-ether substituted carboxylic acid esters. For example, it has been found that amidation of methyl beta-methoxyisobutyrate with dimethylamine at 125°C for 48 hours provides less than 10% conversion of the ester to the amide. This unreactivity has been attributed to the possibility of steric effects which prevent the attack of the amine. In addition, the pyrolytic dehydration of N,N-dimethyl lactamide in the presence of silica spheres, tungsten catalyst or alumina catalyst at 300°C produces a wide variety of degradation products, rather than the desired N,N-dimethylacrylamide.

As a preferred embodiment of the present invention, the N,N-dialkylamides of alpha, beta-olefinically unsaturated monocarboxylic acids are prepared in a three-step process beginning with an ester of an alpha, beta-olefinically unsaturated monocarboxylic acid as the essential starting material. The three-step process can be represented as follows:

Synthesis of N,N-Dialkylamides Of Alpha, Beta-Olefinically Unsaturated Monocarboxylic Acids (1) <u>Michael or Alkoxylation Reaction:</u>

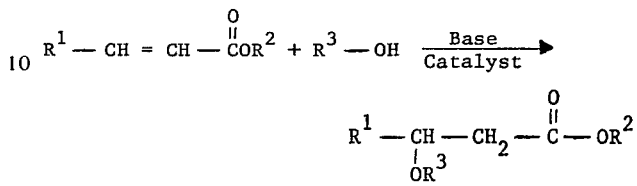

(2) <u>Amidation Reaction:</u>

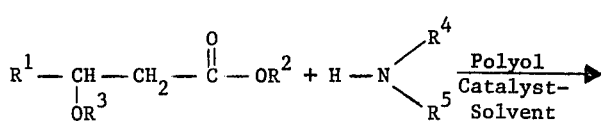

(3) <u>Cracking Reaction:</u>

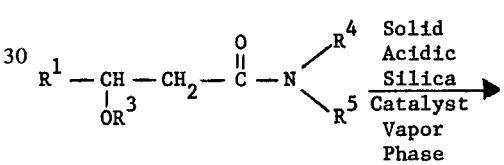

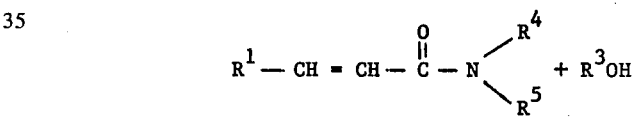

wherein $R^1$ is selected from the group consisting of hydrogen and hydrocarbyl containing from one to about 17 carbon atoms, $R^2$ and $R^3$ are each hydrocarbyl containing from one to about 18 carbon atoms, $R^4$ and $R^5$ are each lower alkyl. Preferably, $R^1$ is hydrogen and $R^2$, $R^3$, $R^4$ and $R^5$ are methyl.

Michael Or Alkoxylation Reaction

The Michael or alkoxylation reaction is conducted by reacting an ester of an alpha, beta-unsaturated carboxylic acid ester with an alcohol in the presence of a basic catalyst.

The esters of alpha, beta-unsaturated carboxylic acids used as starting materials include those wherein the alpha and beta carbon atoms each have at least one hydrogen atom. The beta carbon atom of the ester may have a hydrocarbyl group attached thereto wherein the hydrocarbyl group is alkyl or aralkyl and contains from one to about 17 carbon atoms. In other words, the esters of alpha, beta-olefinically unsaturated monocarboxylic acids contain from about 3 to about 20 carbon atoms. The alcohol moiety of said esters are hydrocarbyl alcohols which may be alkyl or aralkyl and contain from one to about 18 carbon atoms. Esters of lower alkyls such as methyl, ethyl, propyl, isopropyl, butyl are preferred, methyl esters being particularly preferred as the starting materials.

The alcohols used as starting materials in the alkoxylation reaction include the hydrocarbyl alcohols such as the alkanols and aralkanols which contain from one to about 18 carbon atoms. Preferred alcohols include methanol, ethanol, propanol, isopropanol, butanol, methanol being particularly preferred.

It is preferred that the alcohol used in the alkoxylation reaction be the same as the alcohol portion of the alpha, beta-unsaturated acid ester.

Suitable basic catalysts for the alkoxylation reaction include oxides, hydroxides, alkoxides, carbonates, etc. of the alkali metal and alkaline earth metals, as well as other compounds thereof, such as, for example, the quaternary ammonium salts of these compounds.

The amount of basic catalyst employed in the alkoxylation reaction is not critical. Generally, the basic catalyst is present in amounts in the range from about 0.001 mole to about 0.1 mole, preferably, amounts in the range of from about 0.01 mole to about 0.05 mole of the basic catalyst effect the reaction in high yields and conversions.

The reaction is exothermic, therefore, it is generally necessary to control the reaction temperature using conventional cooling techniques. Temperatures in the range of from about ambient to about the boiling point of the reaction mixture are suitable. However, temperatures in the range of from about 35°C to about 65°C are preferred.

At the completion of the reaction, the beta-ether substituted carboxylic acid ester is recovered by neutralization in a suitable acid such as acetic acid, and distilled. Yields of more than 90% are generally obtained of the purified beta-ether substituted carboxylic acid ester, which is suitable for the following amidation reaction.

The Amidation Reaction

The process of the present invention is primarily concerned with amidating beta-ether substituted carboxylic acid esters with dialkylamines. It is applied with particular advantage to the amidation of a beta-hydrocarboloxy propionic acid ester with a dialkylamine wherein the beta-hydrocarboloxy group contains from 1 to about 18 carbon atoms, preferably from 1 to about 10 carbon atoms. Of this group, those wherein the hydrocarboloxy group is a lower alkyl group, preferably from 1 to about 6 carbon atoms, constitute a particularly preferred starting material for the amidation reaction. Representative examples of this particularly preferred group are:

1. Methyl beta-methoxypropionate
2. Ethyl beta-ethoxypropionate
3. Propyl beta-propoxypropionate
4. Butyl beta-butoxypropionate
5. Pentyl beta-pentoxypropionate
6. Hexyl beta-hexoxypropionate Also included are those esters wherein the alkoxy group is of branched or cyclic structure.

The amines employed in the amidation reaction include those amines having but one labile hydrogen atom and substituted with two alkyl groups. As a preferred embodiment of the present invention, the alkyl substituents on the amine are lower alkyl. The term lower alkyl is used herein to designate straight or branched carbon chains up to 6 carbon atoms. Representative examples of preferred dialkylamines to be employed in the amidation reaction include dimethylamine, methylethylamine, diethylamine, ethylpropylamine, dipropylamine, dimethylamine being particularly preferred.

The reaction of carboxylic acid esters with monoalkylamines is a relatively straight forward reaction which generally produces nearly quantitative yields. However, the present invention is primarily concerned with the preparation of N,N-dialkylamides, since these compounds form polymers having a broader spectrum of utility than their N-monoalkyl substituted counterparts. The non-catalyzed amidation of monocarboxylic acid esters using an N,N-dialkylamine, particularly beta-ether substituted monocarboxylic acid esters, is difficult, and attempts to accelerate this reaction by heating results in the formation of undesirable by-products. For example, amidation of methyl beta-methoxypropionate to form N,N-dimethyl beta-methoxypropionamide at temperatures of 100°C–120°C results in the formation of an appreciable amount of beta-methoxypropionic acid which lowers the yield of the product and is very difficult to separate from the desired amide by vacuum distillation. When the acid is carried through to the third step of the process of the present invention (dealkoxylation), the acid also undergoes dealkoxylation and forms the corresponding alpha, beta-olefinically unsaturated monocarboxylic acid. This acid is very difficult to separate from the N,N-dimethylamide of the alpha, beta-olefinically unsaturated monocarboxylic acid. Furthermore, polymerization in the presence of this acid is retarded and results in inferior products not useful for commercial exploitation. The use of higher temperatures causes a second problem, i.e., dimethylamine catalyzed elimination of methanol from N,N-dimethyl beta-methoxypropionamide. The formation of the N,N-dimethylacrylamide is unexpected, since with excess dimethylamine present a Michael addition should occur to form N,N-dimethyl beta-dimethylaminopropionamide.

An analysis of the rate of the amidation of methyl beta-methoxypropionate with dimethylamine at various temperatures has revealed that the ester disappears as a function of temperatures between 80°C and 150°C. However, as the temperature of the reaction increases, the yield of the amide decreases. It is believed that the decrease in the amount of amide is due to two factors:

1. Formation of beta-methoxypropionic acid;
2. Formation of N,N-dimethylacrylamide.

The amount of acid formed increases about three-fold when the temperature is raised from 80°C to 100°C, 4% to 10–14%, respectively.

Therefore, as it can be seen from the above, lower reaction temperatures are necessary during the amidation reaction if acid formation is to be held to a minimum. Thus, in order to make the overall process feasible, the amidation reaction must be catalyzed. Several of the well-known catalysts which are described in the literature and in the patent art to be useful in promoting amidation reactions are not, however, suitable in catalyzing the amidation reaction of the beta-ether substituted monocarboxylic acid esters of the present invention due to the presence of the beta-hydrocarboloxy group on the monocarboxylic acid ester. In other words, while these catalysts of the prior art may be useful in promoting an amidation reaction at low temperatures, they also have a propensity to remove the beta-hydrocarboloxy group from the ester. For example, U.S. Pat. Nos. 3,288,794 and 3,417,114 describe the successful catalytic amidation using sodium methoxide as a catalyst, when the sodium methoxide is present at concentrations up to 8% by mole weight. In the amidation of methyl beta-methoxypropionate, in the presence of 4% to 8% mole weight of sodium methoxide at temperatures below 50°C amidation is promoted, but the sodium methoxide also catalyzes the elimination of methanol (dealkoxylation). This latter reaction results in the formation of N,N-dimethylacrylamide. The N,N-dimethylacrylamide is not stable in the presence of sodium methoxide and undergoes rapid anionic polymerization to provide a low molecular weight polymer. Other known catalysts such as sulfuric acid, bicyclo-[2.2.2]-1,4-diazooctane (DABCO), calcium carbonate and methanol have been found to be unsuccessful as catalysts for the amidation of dialkylamines to the beta-ether substituted monocarboxylic acid esters.

The amidation reaction of the present invention is conducted by reacting the beta-ether substituted monocarboxylic acid ester with a dialkylamine in the presence of a polyol compound having at least two vicinal-hydroxy containing groups. Preferably, an equimolar or an excess of the dialkylamine is employed, however, less than equimolar amounts may be employed as, for example, in a continuous process. It has been found that the use of the polyol compound acts as a catalyst-solvent for the amidation reaction and results in nearly quantitative yields and conversions of at least 90% with less than 2% by-products.

The catalyst for the amidation reaction as referred to hereinabove is a polyol having at least two vicinal-hydroxy groups which may be represented by the general formula:

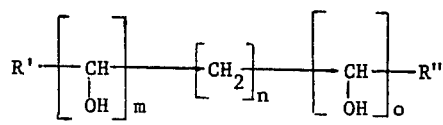

wherein R' and R'' are selected from the group consisting of hydrogen and lower alkyl, and $m$ and $o$ are positive integers and $n$ is zero or a positive integer. If $n$ is greater than or equal to 1, then either $m$ and/or $o$ is greater than or equal to 2. Suitable polyols having at least two vicinal hydroxy groups include ethylene glycol, propylene glycol, glycerine, sorbitol and oligomers of the formula:

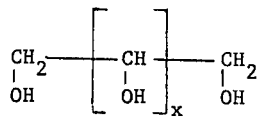

wherein $x$ is a positive integer.

Glycerine and sorbitol are the preferred catalyst-solvents for the amidation reaction, glycerine being the most preferred.

The polyol used as the catalyst-solvent for the amidation reaction should not contain groups which will react with the amine, such as aldehydes which are present in most reducing sugars. Other than this limitation, most any polyol will be suitable in promoting the amidation reaction.

The amidation reaction is preferably conducted at elevated temperatures, preferably temperatures in the range of from about 75°C to about 100°C are employed. Temperatures in the range of from about 75°C to about 85°C are most preferred for obtaining high conversions and yields without the formation of significant amounts of by-products such as the acid which has been discussed hereinabove.

The amidation reaction is preferably conducted under pressures such that the dialkylamine is in the liquid phase, e.g., since dimethylamine boils at 9°C, superatmospheric pressures should be employed. These superatmospheric pressures may be accomplished by employing any suitable inert gas such as nitrogen, argon, etc., or by the use of the autogenous pressure of the amine. The molar portion of the polyol catalyst-solvent employed in the amidation reaction will generally range from about 0.1 mole of polyol to about 10 moles of polyol per mole of the ester which is to be amidated. Preferably, 0.25 mole of polyol to about 4 moles of polyol per mole of ester is employed.

An alternative method for the amidation reaction of the present invention comprises reacting an ester of a beta-ether substituted monocarboxylic acid with the above-described polyol in the presence of a suitable catalyst to form an ester of said polyol. The ester of said polyol is thereafter reacted with the N,N-dialkylamine to produce a reaction product containing an N,N-dialkylamide of a beta-ether substituted carboxylic acid. Suitable catalysts for the esterification reaction include concentrated sulfuric acid, p-toluene sulfonic acid, or any other known esterification catalyst.

A particularly preferred embodiment of the present invention comprises the amidation of methyl beta-methoxypropionate in the presence of glycerine as the polyol catalyst solvent using N,N-dimethylamine as the preferred amine reactant. The reaction product, N,N-dimethyl beta-methoxypropionamide is a novel compound which is capable of separating mixtures containing aliphatic and aromatic hydrocarbons. In other words, the novel amide is useful as a solvent for the extraction of aromatic hydrocarbons from hydrocarbon alkane mixtures. By following the process of the present invention, this novel compound can be prepared industrially in nearly quantitative yields and thereby provides a significant advance in the art.

The amidation reaction produces an alcohol from the ester in addition to the N,N-dialkylamide of the beta-ether substituted monocarboxylic acid. As a preferred embodiment of the invention, the alcohol is recycled to the Michael or alkoxylation reaction.

The polyol catalyst-solvent likewise can be conveniently recovered and recycled in the amidation reaction. In this connection, it is preferred to employ polyols having a sufficiently high molelcular weight such that amide can be recovered therefrom by simple distillation.

Recycling the alcohol and polyol improves the economics and further enhances the industrial feasibility of the overall process.

The Cracking Reaction

The cracking reaction of the N,N-dialkylamide of the beta-ether substituted monocarboxylic acid is conducted in the vapor phase at a temperature of from about 300°C to about 500°C in the presence of a particulate, acidic catalyst with the formation of reaction products consisting predominantly of an N,N-dialkylamide of an alpha, beta-olefinically unsaturated monocarboxylic acid and an alcohol.

The cracking reaction is conducted by introducing into a reaction zone containing a particulate, acidic catalyst, the N,N-dialkylamide of the beta-ether substituted monocarboxylic acid. The N,N-dialkylamide of the beta-ether substituted monocarboxylic acid may be introduced by any convenient means such as by trickling the charge into the reaction zone, or by preheating the charge and passing the vapors of the amide through a bed of the catalyst particles in the reaction zone or by sweeping the vapors with a carrier gas into the reaction zone. It is preferred to preheat the vapors of the amide prior to introducing the amide charge into the reaction zone.

The cracking reaction is conducted at a temperature in the range of from about 300°C to about 500°C, and preferably in the range of from about 350°C to about 425°C. When converting the N,N-dimethylamide of beta-hydrocarboloxy propionic acid wherein the hydrocarboloxy group is a lower alkoxy group, maintenance of the temperatures in the reaction zone at about 400°C is particularly preferred.

The process can be performed at atmospheric or subatmospheric pressures. The use of superatmospheric pressure may be employed within the scope of the invention. However, no significant advantage is derived by the use of pressures substantially higher than those which lie somewhere above atmospheric. Generally, the reaction is conducted at pressures in the range of from about 50 mm. to about 760 mm. and, preferably, in the range of from about 100 mm. to about 450 mm. When converting the N,N-dimethylamide of beta-alkoxypropionic acid wherein the alkoxy group is a lower alkoxy group, such as methoxy, a pressure of about 100 mm. is particularly preferred when the temperature is about 400°C.

The feed rate of the amide charge into the reaction zone may vary considerably, depending upon the pressure and temperature in the reaction zone.

As catalysts, there are employed in the process of the invention a particulate, acidic catalyst. The particulate, acid catalyst referred to in this invention pertains to those materials whose surface structure does not change appreciably at the reaction temperature and under the reaction conditions employed during the process.

It is essential for the successful performance of the cracking reaction to use a particulate, acidic catalyst. Attempts to catalytically convert N,N-dimethyl beta-methoxypropionamide to N,N-dimethylacrylamide in appreciable conversions with known cracking catalysts such as p-toluene-sulfonic acid, phosphorous pentoxide, pyridine or anion exchange resins have been unsuccessful. Benzyltrimethylammonium hydroxide and lithium hydroxide have been found to be effective cracking catalysts. However, these catalysts cause extensive polymerization in the column when the reaction is conducted in the liquid phase. Lithium hydroxide on silica spheres or on Hengar granules catalyzes conversions of 90% at 200°C, but accompanying polymerization on the column with a resultant resinous deposit on the catalyst renders this catalyst system unfeasible. A potassium carbonate on silica type preparation in the vapor phase also results in extensive polymerization in the column. Therefore, the use of a particulate, acidic catalyst is apparently essential to the successful practice of the present invention.

Typical particulate, acidic catalysts useful in the practice of the present invention include those compositions which contain a predominant amount of acidic silica. Examples of such particulate, acidic silica-containing catalysts include the silicates, aluminosilicates and phosphates of the metals: potassium, sodium, magnesium, calcium, barium, aluminum and boron; oxides of iron, chromium, cobalt, titanium, manganese, copper, nickel, zinc, tungsten, molybdenum, cerium and zirconium, and mixtures of said compounds. Natural and synthetic products may be used, such as are obtained by co-precipitation. Examples of suitable compounds are sodium aluminosilicate, potassium aluminosilicate, calcium aluminosilicate, pumice, barium silicate, aluminum silicate, etc. It is preferred to use silicates which have a high content of silica as, for example, the natural minerals. Also suitable as the cracking catalysts are those highly porous bead-formed silica catalysts described in U.S. Pat. No. 3,676,366 to Podschus et al., and assigned to Farbenfabriken Bayer Aktiengesellschaft.

A particularly preferred cracking catalyst for use in the present invention comprises a particulate, acidic catalyst containing a predominant amount of $SiO_2$, i.e., more than 50% by weight $SiO_2$. It is preferred that the particulate, acidic silica-containing catalysts contain minor portions of oxides of aluminum and iron. A typical catalyst useful in the practice of the present invention includes a catalyst having at least about 90% by weight $SiO_2$, 1–5% by weight $Al_2O_3$ and a small amount of up to about 7% $Fe_2O_3$. Calcium oxide and MgO may also be present in said catalyst. It is preferred that the catalyst have a pH of from about 4 to about 7. The catalyst will typically have a surface area of 150–200 $m^2/g$. and a bulk density of about 550 g./l. The pore volume of the catalyst preferably used by the present invention will be from about 0.6 to about 0.7 l./kg. and will have a density of from about 0.45 kg./l. to about 0.5 kg./l. The particle size will generally fall in the range from about 4 mm. to about 5 mm. The catalysts hereinabove described are commercially available from the Chemetrom Corporation and known as the KA catalysts.

A particular advantage of the invention resides in the economy of the process with respect to catalyst utilization. The catalyst remains within the reaction zone for unusually long periods of operation in its active state. Therefore, the process lends itself to continuous operation. In continuous operation, the reaction zone is filled with particles of the acidic catalyst and the N,N-dialkylamide of the beta-ether substituted monocarboxylic acid is introduced into the reaction zone in a suitable manner. Reaction products comprising the N,N-dialkylamide of the alpha, beta-olefinically unsaturated monocarboxylic acid and alcohol are continuously formed and recovered from the reaction mixture substantially as rapidly as formed. Fresh amide charge is continuously introduced into the system under conditions maintaining the desired pressure and temperature. The catalyst is usually in the form of a stationery bed, but a dynamic or fluidized bed may be used.

The alcohol by-product recovered from the reaction mixture may be recycled to the alkoxylation reaction or, preferably, combined with the alcohol formed during the amidation reaction and the combined alcohol mixture used during the alkoxylation reaction.

The catalyst may be reactivated upon its deactivation by simply passing air over the catalyst at temperatures above about 550°C.

The reaction zone for the cracking reaction of the invention is not limited to the use of any specific type of apparatus, however, it is preferred to employ as the reaction zone a reaction chamber, or vessel, in communication with a suitable recovery vessel wherein the gaseous products are recovered in the liquid phase. The reaction products condensing from the reaction mixture in the cracking reactor may be conveniently distilled and fractionated. Overhead from the fractionator column will comprise the desired N,N-dialkylamide of the alpha, beta-olefinically unsaturated monocarboxylic acid and alcohol.

The effluent from the reaction zone can be conveniently passed to a product recovery zone wherein it is subjected to suitable conventional product recovery means comprising one or more such steps, as for example, condensation, distillation, extraction, extractive distillation, absorption scrubbing, crystallization, and the like. Any unconverted materials, and if desired, by-products such as for example, the alcohol, may be recycled to the alkoxylation reaction zone hereinabove described.

The use of stabilizers in the reaction zone or in the recovery zone is also comprised within the scope of the invention. Thus, stabilizers such as, for example, air, oxygen, organic nitroxides, quinones, and hydroquinone and its ethers, benzoquinone, sodium nitrite, nitric oxide, cresols, carvacrol, thymol, catechol, resorcinol, chromium metal, diarylbenzoquinonediimine dioxides, hydroquinone formaldehyde resins, phenothioazene, tetrahydroxyleucoanthroquinone, chloranil, furnace black (charcoal), borohydrides, oxadiazoles, the aromatic diamines, the benzophenone ethers, the semicarbazides, the N-cyanoazepines, 2,3-dicyanobenzoquinone, the triphosphite esters, the metals and their salts of animony, arsenic, aluminum, bismuth and zinc, and many of the other well-known polymerization inhibitors and stabilizers used to prevent premature polymerization of alpha, beta-olefinically unsaturated compounds may be employed in the process of the invention.

The following examples serve to more fully describe the manner of making and using the above-described invention, as well as to set forth the best modes contemplated for carrying out various aspects of the invention. It is understood that these examples in no way serve to limit the true scope of this invention, but rather, are presented for illustrative purposes only. It will be understood that all proportions are in parts by weight, unless otherwise indicated.

EXAMPLE 1

Preparation of Methyl Beta-Methoxypropionate

A 20 ml. portion of the methoxide solution prepared by dissolving 4.6 grams of sodium metal in 150 ml. of methanol is added with stirring to a mixture of 1,720 grams of methyl acrylate and 800 grams of methanol at room temperature. An exothermic reaction occurs and the reaction temperature rises from 17°C to 40°C in 65 minutes. The reaction temperature is maintained between 30°C and 40°C by external cooling in a water bath. After about 1.5 hours reaction time, no further exotherm is observed and another 20 ml. portion of methoxide solution is added. Another exotherm is noted. The reaction temperatures are maintained at 30°C and 40°C by external cooling until the disappearance of an exotherm. Additional 20 ml. increments of the methoxide catalyst are added at 3 and 4 hour intervals and during this time a white precipitate is formed. After 4.5 hours of reaction time, the reaction appeared to be 90% complete, as determined by gas chromatography analysis. The mixture is kept overnight at room temperature. Analysis by gas chromatography indicates a 95% conversion has occurred. The product mixture is neutralized by the addition of 7 ml. of glacial acetic acid. The unreacted methanol and acrylate are removed at reduced pressure to give 2,211 grams of beta-methoxy methyl propionate, which is 98% pure, as determined by gas chromatography. The ester is distilled and the purified ester has a boiling point ranging from 139°C to 143°C at atmospheric pressure, the majority, i.e., 90%, has a b.p. of 142°C to 143°C. A 93.5% yield of the methyl beta-methoxypropionate is obtained.

EXAMPLE 2

Preparation Of Methyl Beta-Methoxypropionate

To a 12-liter, 3-necked, round-bottomed flask fitted with a Tru-Bore stirrer, condenser, and pressure-equalizing dropping funnel, there is added 5,385 grams (62.6 moles) of methyl acrylate and 2,570 grams (80.3 moles) of methanol. The funnel is charged with 108 grams of a 25% sodium methoxide/methanol solution (0.5 mole of sodium methoxide) and the contents slowly added to the flask over a 2-hour period as an exotherm is observed. The reaction temperature is maintained at 35°-39°C by an ice/water bath. After standing an additional 2 hours, 35 ml. of acetic acid is added. Distillation of the mixture produces 6,838.2 grams (93% theory) of methyl beta-methoxypropionate, b.p. 87°C at 108 mm.

EXAMPLE 3

Non-Catalytic Amidation Of Methyl Beta-Methoxypropionate

In a typical amidation, 250 grams (2.1 moles) of methyl beta-methoxypropionate as prepared in Example 2 is sealed in a Parr pressure bomb. The bomb is cooled to 0°C to 5°C in a dry ice/acetone bath, and 445 grams (9.9 moles) of dimethylamine is condensed in the bomb. The bomb is heated with agitation to 80°C. Analytical samples are withdrawn periodically and examined by gas chromatography. After 40 hours, 54% conversion to amide is observed. The bomb is cooled to room temperature and the contents of the bomb are removed after venting the gaseous dimethylamine. The unreacted dimethylamine is stripped off on a rotary evaporator at reduced pressure. Distillation of the residue provided 145.4 grams of N,N-dimethyl beta-methoxypropionamide having a b.p. 110°-119°C at 22 mm. This amounts to an 88.4% isolated yield based on recovered starting material. The beta-methoxypropionic acid is present to the extent of 7.4 grams (4.2%).

EXAMPLE 4

Non-Catalytic Amidation Of Methyl Beta-Methoxypropionate 311.52 grams (2.64 moles) of methyl beta-methoxypropionate is charged in a sealed Parr bomb. The bomb is evacuated several times and filled with a dry nitrogen atmosphere. 297 grams (6.60 moles) of dimethylamine is condensed in the bomb. This is accomplished by cooling the bomb to −10°C to −15°C in an ice/acetone bath and passing dimethylamine gas into the methyl beta-methoxypropionate. After condensing the proper amount of dimethylamine, the bomb is heated to 100°C for 24 hours. The initial pressure is 180 psi. After 16 hours, the pressure of the bomb decreases to 100 psi. At the end of 24 hours, the conversion of the ester is 90.4%. The bomb is cooled to room temperature, vented and the unreacted dimethylamine is removed at aspirator pressure on a rotary evaporator. Distillation of the residue results in a recovery of 245.8 grams of N,N-dimethyl beta-methoxypropionamide having a b.p. 120°-133°C at 27-28 mm., and 25.6 grams (10.3%) of by-product contaminate, beta-methoxypropionic acid. The yield of the N,N-dimethyl beta-methoxypropionamide is only 71%.

EXAMPLE 5

Catalytic Amidation Of Methyl Beta-Methoxypropionate 295 grams (2.5 moles) of methyl beta-methoxypropionate and 184 grams (2.0 moles) of glycerol are sealed in a Parr pressure bomb. The bomb is cooled to 0°–5°C in a dry ice/acetone bath and 285.6 grams (6.35 moles) of dimethylamine is condensed in the bomb. The bomb is heated to 80°C. Analytical samples are withdrawn periodically to monitor the conversion by gas chromatography. After 23 hours, 98% conversion to amide is observed. The bomb is cooled to room temperature, vented and the unreacted dimethylamine is removed at aspirator pressure on a rotary evaporator. Distillation of the residue afforded 287.6 grams of N,N-dimethyl beta-methoxypropionamide having a b.p. 111°–120°C at 22 mm., only 4.0 grams (1.2%) of beta-methoxypropionic acid by-product occurs from the catalyzed reaction. The isolated yield of N,N-dimethyl beta-methoxypropionamide is 89.2%.

EXAMPLE 6

Catalytic Amidation Of Methyl Beta-Methoxypropionate 295 grams (2.5 moles) of methyl beta-methoxypropionate in 92 grams (1.0 mole) of glycerol are sealed in a Parr pressure bomb. The bomb is cooled to 0°–5°C in an acetone/ice bath, and 273 grams (6.07 moles) of dimethylamine is condensed in the bomb. The contents of the bomb are heated to 80°C at a pressure of 60 psi. Analytical samples are withdrawn periodically to monitor the conversion by gas chromatography. After 21 hours, 94.2% conversion to N,N-dimethyl beta-methoxypropionamide has occurred. The bomb is cooled to room temperature, vented and the unreacted dimethylamine is recovered at aspirator pressure on a rotary evaporator. Distillation of the residue afforded 258.9 grams of N,N-dimethyl beta-methoxypropionamide having a b.p. 113°–119°C at 23 mm., and only 2.2 grams (0.9%) of beta-methoxypropionic acid by-product. The isolated yield of the N,N-dimethyl beta-methoxypropionamide is 84.3%.

The above procedure is repeated at a reaction temperature of 100°C and a 99% conversion of the ester is obtained with less than 5% (11.8 grams) of beta-methoxypropionic acid.

EXAMPLE 7

Catalytic Amidation Of Methyl Beta-Methoxypropionate

This example illustrates the use of ethylene glycol as a catalyst in the amidation reaction. 295 grams (2.5 moles) of methyl beta-methoxypropionate and 62 grams (1.0 mole) of ethylene glycol are sealed in a Parr bomb. The bomb is cooled to 0°–5°C and 281 grams (6.25 moles) of dimethylamine is condensed into the bomb. The bomb is heated to 80°C. Gas chromatography analysis shows that the reaction is 93.1% complete after 32 hours. The bomb is cooled, and gaseous dimethylamine vented and all the low boiling components removed at reduced pressure on a rotary evaporator. Distillation of the residue produces 280.4 grams (91.9% yield based on theory) of N,N-dimethyl beta-methoxypropionamide, b.p. 116°–121°C at 22-23 mm., and 11.97 grams (3.9%) of beta-methoxypropionic acid.

As it can be seen from the above experimental data, the non-catalyzed amidation of methyl beta-methoxypropionate at 80°C results in poor conversions and slow reaction times with the formation of beta-methoxypropionic acid by-product. The presence of beta-methoxypropionic acid lowers the yield of the product and is very difficult to separate from the desired amide by vacuum distillation. Higher conversions and faster amidation of the non-catalyzed amidation of methyl beta-methoxypropionate can be accomplished by increasing the temperature to 100°–125°Cc. However, the formation of beta-methoxypropionic acid is present in appreciable amounts. As it can be seen from the above examples, the catalyzed reaction using a polyol compound increases the product yield and minimizes the side reaction. From an economical standpoint, the reuse of the catalyst would be advantageous.

The following examples demonstrate that the activity of the polyol catalyst-solvent is maintained during the reuse of the catalyst and a constant isolated yield of about 94%, based on theory, of the N,N-dimethyl beta-methoxypropionamide is obtained by the reuse of the polyol catalyst-solvent. These examples also demonstrate that no appreciable production of impurities is obtained and the catalyst can be recovered in high yields by high vacuum distillation in an unchanged condition. The main loss of catalyst is merely a mechanical consideration in transferring the viscous material from the still pot to the autoclave.

EXAMPLE 8

Catalytic Amidation Of Methyl Beta-Methoxypropionate

This example illustrates the recyclization of the polyol catalyst. 295 grams (2.5 moles) of methyl beta-methoxypropionate, 282.7 grams (6.3 moles) of liquid dimethylamine, and 172 grams (2.5 moles) of glycerol catalyst-solvent recovered from the catalyzed amidation reaction of Example 6 are sealed in a Parr pressure bomb. The bomb is heated to 80°C. Gas chromatography analysis shows that the reaction is 98% complete after 21 hours. The bomb is cooled, gaseous dimethylamine vented, and all the low boiling components are removed at reduced pressure (40 mm.) on a rotary evaporator. Distillation of the residue afforded 298.5 grams (93.4% theory) of N,N-dimethyl beta-methoxypropionamide, b.p. 110°–120°C at 22 mm. and 0.68 gram (0.2%) of beta-methoxypropionic acid.

EXAMPLE 9

Catalytic Amidation Of Methyl Beta-Methoxypropionate

In this example, amidation of methyl beta-methoxypropionate was conducted in a 2-liter Parr bomb autoclave at 80°C for 17 hours by sealing 295 grams (2.5 moles) of methyl beta-methoxypropionate, 300 grams (6.65 moles) of anhydrous dimethylamine and 184 grams (2.0 moles) of glycerol. After the amidation is completed, the mixture is transferred to a distillation flask and the product is recovered at 20 mm. at a temperature of 116°–125°C. Distillation is taken to pot temperature of 150°C, which corresponds to a vapor temperature of 125°C. The distillates and still bottoms are analyzed by gas chromatography for N,N-dimethyl beta-methoxyproprionamide, beta-methoxypropionic acid and glycerol. Following the recovery of the desired N,N-dimethyl beta-methoxypropionamide, six successive runs using fresh methyl beta-methoxypropionate and dimethylamine are aadded to the still bottoms of the previous run. Since the still bottoms retain a rather constant amount of the amide, the recovery in the first run is lower than in the subsequent runs. Table I illustrates the summary of the seven amidation reactions.

TABLE I

Reuse of Glycerol Catalyst In Amidation Of Methyl Beta-Methoxypropionate

| Catalyst Use | N,N-Dimethyl Beta-Methoxypropionate In Distillate | |
|---|---|---|
| | grams | moles |
| 1 | 278.4 | 2.12 |
| 2 | 308.7 | 2.36 |
| 3 | 307.9 | 2.35 |
| 4 | 309.8 | 2.36 |
| 5 | 312.9 | 2.38 |
| 6 | 307.8 | 2.35 |
| 7 | 306.7 | 2.34 |
| From final still bottoms by high vacuum distillation | 14.0 | 0.11 |
| | 2,146.2 g. | 16.37 moles |

Total ester used = 2,070 g. = 17.5 moles
Isolated Yield = 16.37/17.50 = 94.0%
Catalyst loss during 6 transfers: 184.0 − 162.4 = 21.6 g. or 11.4%
Catalyst recovery from final still bottoms by high vacuum distillation = 152.8 g.

EXAMPLE 10

Amidation Of Polyol Ester

This example illustrates the amidation reaction wherein the methyl beta-methoxypropionate is converted by transesterification to the polyol ester prior to amidation. 198.2 grams (1.68 moles) of methyl beta-methoxypropionate, 154.5 grams (1.68 moles) of glycerol and 1 gram (0.01 mole) of sulfuric acid are added to a 1,000 ml. round-bottomed flask fitted with a Dean-Stark trap and condenser. The mixture is slowly heated. At 100°C, methanol begins to distill and is collected in the Dean-Stark trap. A total of 60.5 grams (1.89 moles) of methanol is collected. Infrared (I.R.) spectroscopy confirmed glycerol ester formation. A 268.5 grams (89.4%) sample of the glycerol ester is obtained. 268.5 grams (1.51 moles) of the glycerol ester prepared above and 205.5 grams (4.56 moles) of liquid dimethylamine are sealed in a Parr pressure bomb. A reaction temperature of 80°C is maintained throughout the reaction. Conversion is followed by infrared spectroscopy. After 7 hours, 95% conversion to amide is observed.

It is demonstrated in the previous examples that the amidation of methyl beta-methoxypropionate can be accomplished at low temperatures, i.e., 80°C, when a polyol catalyst-solvent such as ethylene glycol or glycerol are employed. It has also been found that an increase in the vicinal hydroxy groups, such as by employing sorbitol, also increases the yields and conversions. The use of a polyol catalyst-solvent increases the rate of amidation at low temperatures while lowering the amount of acid formed.

Glycerol and the polyols containing several vicinal hydroxy groups, such as sorbitol, also act as good pot bottoms for the distillation of the amide. The catalyst can, therefore, be recycled, rendering the amidation commercially feasible. Moreover, the distilled in-hand yield of amide, by the practice of the present invention increases from 60% to 90% by eliminating the formation of the beta-alkoxypropionic acid and N,N-dimethylacrylamide.

EXAMPLE 11

Catalytic Cracking Of N,N-Dimethyl Beta-Methoxypropionamide

The catalytic cracking of N,N-dimethyl beta-methoxypropionamide to N,N-dimethylacrylamide is conducted in a column described below. The column consists of a copper pipe (approximately 1⅛ inch ID), 30 inches long, wrapped with 3 400-watt porcelein bead-type heating elements — each covering a 10-inch segment of the pipe. Heavy insulation is used to cover the heating element. Each of the heaters is controlled with a powerstat. A 1-inch diameter Vycor tube fitted with standard tapered joints and indented near the lower end is slipped into the copper pipe. A vapor take-off head is fitted with three thermocouples in such a manner that when the column is assembled, the leads extend to three levels of the catalyst bed. A 200-ml., 3-necked flask is used as a reboiler. Heat for this is provided by a manual heated oil bath. The take-off head is connected to a condensing system consisting of a cold-water condenser, a receiver in dry ice-acetone and two traps in a dry ice-acetone. A vacuum source is attached to the second dry ice trap. Volume of the heated zone of the pyrolysis column is 275 ml. When the column is packed with 125 grams of the acidic silica sphere catalyst (described below), the free volume is 213 ml. The feed rate is controlled by a micrometer valve in a one-eighth-inch stainless steel feed tube extending from a pressurized reservoir to the pyrolysis reboiler.

The particulate, acidic catalyst used in the cracking reactions described in the following example is a commercially available silica catalyst and can be obtained from Chemetron Corporation and designated as Girdler T-1571. The catalyst has the appearance of three-sixteenths-inch spheres and is analyzed to have about 93% $SiO_2$, 3% $Al_2O_3$, 1% $Fe_2O_3$, 0.2% CaO, 0.5% MgO, and about 2% residual materials which are lost on ignition. The catalyst has a surface area of 150–200 $m^2/g$. and a pH of about 4. The bulk density of the catalyst is about 550 g./l. and a pore volume of 0.6 to 0.7 l./kg. The catalyst has a density of 0.45 to 0.5 kg./l. and a specific gravity of 2.2 g./ml. It has a crush strength of 3–5 kg. The catalyst is conditioned by heating at 300°C at 100 mm. for 4–8 hours until the moisture is removed from the catalyst.

Prior to the cracking reaction, the feed reservoir is filled with N,N-dimethyl beta-methoxypropionamide and a nitrogen pressure of 30 psi is applied to the reservoir. The column is preheated and equilibrated at the desired temperature. The oil bath surrounding the reboiler is heated to 240°–250°C. All dry ice-acetone baths are placed in order, cold condenser water is turned on and the pressure of the column and condensing train is reduced to 100 mm. A timer is started as the microvalve is opened to permit dropwise feed into the boiling chips in the reboiler. The rate of feed is determined as soon as possible and adjusted to that desired. (This generally takes 5–10 minutes.) Generally speaking, very little N,N-dimethylacrylamide is carried into the traps and only a small amount of methanol is collected in the first trap. A sampling device is designed and built into the receiving system so that stream samples of 5–10 ml. can be taken. During the run settings of each of the powerstats and temperatures of the oil bath, the vapor in the reboiler, each segment of the column and the vapor leaving the column are observed and recorded. At the conclusion of the run, contents of the receiver and traps are weighed and analyzed. The feed into the system is determined in grams by a weighback of unused feed. Thus, the material balance and yield data are obtained. Conversion data are obtained by gas chromatography analysis of the pyrolysates using calibration curves.

The cracking reaction is begun by bringing the column temperature to 400°C and bringing the oil bath temperature surrounding the reboiler to 246°C and adjusting the pressure to 85 mm. Hg. 500 grams (3.820 moles) of N,N-dimethyl beta-methoxypropionamide is fed to the reboiler at a rate of 4.3 ml./min. The temperatures of the three zones of the column fluctuate somewhat, with the lower zone dropping to 345°C, the center to 380°C, and the upper zone climbing to 420°C. Powerstat controlling units are adjusted to bring the temperatures back to 400°C. The total time for completion was 118 minutes. 482 grams of pyrolysate containing 353 grams (3.57 moles) of N,N-dimethylacrylamide and 29 grams (0.233 mole) of N,N-dimethyl beta-methoxypropionamide is obtained from the cracking reaction. The traps contain 14.3 grams of methanol. The material loss was only 3.7 grams. The conversion to N,N-dimethylacrylamide is 94.2% (3.570/3.803). The yield obtained during the cracking reaction is 99% (3.57/3.607). By vacuum distillation of the pyrolysate, 296 grams of pure N,N-dimethylacrylamide is recovered. This is a 93% yield of that indicated by gas chromatography analysis of the crude pyrolysate.

EXAMPLE 12

Catalytic Cracking Of N,N-Dimethyl Beta-Methoxypropionamide

The procedure of Example 11 is repeated several times using the same catalyst and cracking column, employing differing temperatures, pressures and feed rates. A summary of the conditions of each of the experiments and the respective conversions to the desired N,N-dimethylacrylamide (NNDMA) are given in Table II.

TABLE II

Pyrolysis of N,N-Dimethyl Beta-Methoxypropionamide

| Temperature,°C | Conversion to NNDMA, % | | | | | |
|---|---|---|---|---|---|---|
| | 200 | | 300 | 350 | 375 | 400 |
| Feed Rate ml./min. | 50 mm. | 100 mm. | 100 mm. | 100 mm. | 100 mm. | 100 mm. |
| 0.17 | 14.0 | — | — | — | — | — |
| 0.19 | — | 42.7 | — | — | — | — |
| 0.21 | — | 31.0 | — | — | — | — |
| 0.28 | 9.6 | 29.6 | — | — | — | — |
| 0.32 | 13.7 | — | 100.0 | — | — | — |
| 0.40 | 9.9 | — | — | — | — | — |
| 0.50 | — | 21.6 | — | — | — | — |
| 0.56 | 9.1 | — | 95.0 | — | — | — |
| 0.60 | 6.8 | — | — | — | — | — |
| 0.80 | — | — | 74.8 | 100.0 | — | — |
| 1.25 | — | — | 55.7 | — | — | — |
| 1.50 | — | — | 54.6 | 100.0 | — | — |
| 1.85 | — | — | 56.3 | — | — | 100.0 |
| 2.00 | — | — | 60.2 | 92.5 | — | — |
| 2.50 | — | — | 36.0 | 89.4 | — | — |
| 2.80 | — | — | — | — | 92.0 | — |
| 3.00 | — | — | 24.5 | — | — | 100.0 |
| 4.30 | — | — | — | — | — | 94.2 |
| 5.00 | — | — | — | 81.8 | — | — |
| 6.30 | — | — | — | — | — | 90.5 |
| 7.20 | — | — | — | — | — | 93.5[a] |

(a) At 200 mm. Hg. pressure.

As it can be seen from Table II above, the temperature, feed rate, and pressure are the principle variables employed. An analysis of the data presented in Table II reveals that a constant feed rate of 3.0 ml./min., a temperature change from 300°C to 350°C to 400°C gives conversions of 24%, 88%, and 98%, respectively. At a constant temperature of 300°C, an increase in feed rate from 1.0 to 2.0 to 3.0 ml./min. results in conversions of 72%, 47% and 24%, respectively. At a cracking temperature of 200°C with a feed rate of 1.5 ml./min., a change in pressure from 100 mm. to 50 mm. results in a decrease in conversion from 21% to 8%. Conversely, increasing pressure to 200 mm. at 400°C results in approximately doubling the throughput. All of the data shown above demonstrates the effect of contact time of the N,N-dimethyl beta-methoxypropionamide vapor in the column.

The pyrolytic conversion of N,N-dimethyl beta-methoxypropionamide at a temperature of 200°C or less is totally unfeasible, when using an acidic silica catalyst. Thus, at 200°C and 100 mm. pressure, the maximum conversion obtained is 42.5% at a feed rate of 0.2 ml./min. A decrease in pressure of 50 mm. merely decreases the level of conversion.

As it can be seen from the above data, complete conversion is obtained at 300°C, but the feed rate is only 0.3 ml./min. This low rate of production can be improved by increasing the temperature from 325°C. A conversion of 82% is obtained at a feed rate of 5 ml./min. Complete conversion is obtained by slowing the feed rate to 1.5 ml./min. A further increase in productivity is achieved by pyrolysis at 400°C. At this temperature, a feed rate of 6 ml./min. results in a 91% conversion. At half this feed rate, a 100% conversion is obtained.

EXAMPLE 13

Catalytic Cracking Of N,N-Dimethyl Beta-Methoxypropionamide

Theoretically, changing pressure from 100 mm. Hg. to 200 mm. Hg. should double the throughput of the N,N-dimethyl beta-methoxypropionamide. The following pyrolysis described below illustrates carrying out the cracking reaction at 400°C and 200 mm. Hg. pressure.

Using the same catalyst and reactor as described in the previous examples (Example 11), the conversion of N,N-dimethyl beta-methoxypropionamide to N,N-dimethylacrylamide is performed. The reboiler is heated with a Glas-Col mantle at maximum voltage and using two heat lamps. The maximum feed rate at which pooling or flooding in the reboiler did not occur was 7.2 ml./min. This rate is maintained for 46 minutes. Analysis of the pyrolysate illustrates a conversion of N,N-dimethyl beta-methoxypropionamide to N,N-dimethylacrylamide of 93.5% with a yield of 100%. The endothermic reaction from the larger quantity of material causes the temperatures of the lower and middle sections of the column to drop 60°C and 45°C, respectively. An increase of the heat load to these sections is insufficient to offset the endotherm. This temperature drop may have been instrumental in the lower conversion.

Another variable encountered during the pyrolysis described above pertains to the product impurities in the crude N,N-dimethyl beta-methoxypropionamide compared to that obtained using redistilled feed material. The presence of beta-methoxypropionic acid, a by-product of the amidation reaction, leads to the formation of acrylic acid, which cannot be separated from N,N-dimethylacrylamide with moderate rectification. When contaminated, N,N-dimethyl beta-methoxypropionamide is used, carbonization of the catalyst occurs resulting in decreased deficiency. Therefore, it is imperative that the N,N-dimethyl beta-methoxypropionamide used during the catalytic cracking reaction be substantially free of any beta-methoxypropionic acid. As mentioned above, the elimination of the beta-methoxypropionic acid impurity can be accomplished by the practice of the present invention by the use of a polyol catalyst containing at least two vicinal hydroxy groups.

To illustrate the effect of the presence of beta-methoxypropionic acid on the catalyst life, a continuous 51 hour pyrolysis reaction at 400°C with a feed rate of 2.8 ml./min. is employed. An overall conversion of 95.5% and a yield of 97% is obtained during the pyrolysis reaction. This experiment was conducted using the same equipment as described hereinabove (including the catalyst composition described hereinabove), except that mild steel segments are inserted in the column. This study revealed that the mild steel segments did not have any effect on the pyrolysis or the stability of the monomer. The activity of the catalyst during the run declined approximately 11% with a sharp decline occurring after about 11,500 grams of N,N-dimethyl beta-methoxypropionamide had been pyrolyzed. The starting material was 98% pure. The acid contaminant contributed to the decline in catalyst activity. However, the activity is readily restored by drawing air through the catalyst at 550°C. This was confirmed by conducting a second pyrolysis through the same catalyst bed and obtaining a 99.8% conversion at 400°C with a feed rate of 3 ml./min.

Attempted catalytic cracking and dealkoxylation of N,N-dimethyl beta-methoxypropionamide was performed by packing columns with montmorillonite, alumina T-1767, tungsten W0A01T, alumina T-1767 ($K_2CO_3$ doped 20%), glass beads, and $K_2CO_3$. The column temperature was above about 300°C and the pressure ranged from 25–105 mm. Hg. The conversions to N,N-dimethylacrylamide were about 30%, 35%, 60%, 30%, 0% and 95%, respectively. While the conversion using $K_2CO_3$ was satisfactory at 300°C and 45–55 mm. Hg., the yield was only 75%. When the temperature of the $K_2CO_3$ column was lowered to 205°–235°C, and the pressure was 90–95 mm. Hg., the conversion decreased to about 30%, whereas, the use of an acidic silica catalyst under substantially the same temperature and pressure resulted in better than 95% conversions and yields of up to 92%.

EXAMPLE 14

Catalytic Cracking Of N,N-Dimethyl Beta-Methoxypropionamide

A pyrolytic cracking column filled 125 grams of catalyst is prepared in the same manner described above in Example 11.

A series of successive pyrolyses of N,N-dimethyl beta-methoxypropionamide to N,N-dimethylacrylamide are performed at atmospheric and slightly reduced pressure (450 mm.) at a temperature of 400°C. In the runs designated hereinbelow, the N,N-dimethyl beta-methoxypropionamide was prepared by catalytically amidating methyl beta-methoxypropionate with dimethylamine in the presence of glycerol as the catalyst-solvent. The charge (N,N-dimethyl beta-methoxypropionamide) is introduced into a hot vaporizing boiler from a pressurized feed reservior via a double micrometer valve. From the boiler, the vapors ascend through the catalyst bed, which is heated to the desired temperature. The pyrolytic gases then pass down through a condensing system into a receiver. The line to the vacuum source is attached to the dry ice-acetone traps beyond the receiver.

The relevant data from the successive runs of this example and the reaction conditions are described in Table III.

TABLE III

Pyrolysis of N,N-Dimethyl Beta-Methoxypropionamide

| Pressure | Temp., °C | Feed Rate, ml./min. | Catalyst In Column, Grams | Conversion % | Distilled Yield, % |
|---|---|---|---|---|---|
| Atmos | 400 | 2.8 | 125 | 100 | 86.7 |
| Atmos | 350 | 3.0 | 125 | 96 | 89.0 |
| Atmos | 400 | 2.1 | 42 | 94 | 88.5 |
| 100 mm. | 400 | 2.9 | 42 | 80 | 88.5 |
| 100 mm. | 400 | 2.7 | 84 | 96 | 70.0 |
| Atmos* | 400 | 2.5 | 125 | 100 | 90.2 |

TABLE III-continued

Pyrolysis of N,N-Dimethyl Beta-Methoxypropionamide

| Pressure | Temp., °C | Feed Rate, ml./min. | Catalyst In Column, Grams | Conversion % | Distilled Yield, % |
|---|---|---|---|---|---|
| 450 mm.* | 400 | 2.1 | 125 | 100 | 89.0 |
|  |  | 3.1 |  | 97.7 | 92.5 |
| 100 mm.* | 400 | 2.9 | 125 | 98 | 93.0 |

*Feed prepared by a glycerol catalyzed amidation reaction.

In the runs using a partially filled column of catalyst, the non-reactive space is in the lower portion of the column and is packed with Vycor rasching rings. This area serves as a preheater.

At atmospheric pressure and 400°C, complete conversion is attained. Distillation of the pyrolysate results in recovery of about 87% of the theoretical monomer. Lowering the temperature to 350°C results in incomplete conversion of 96%, but the recovered monomer yield is slightly higher (89%).

EXAMPLE 15
N,N-Dimethyl Beta-Methoxypropionamide As A Solvent For Extraction Of Aromatic Hydrocarbons This example illustrates that N,N-dimethyl beta-methoxypropionamide is a selective solvent for extracting aromatic hydrocarbons from a mixture containing aromatic and aliphatic hydrocarbons.

a. 5 ml. of hexane is mixed with 5 ml. of N,N-dimethyl beta-methoxypropionamide and vigorously shaken. The mixture is allowed to stand in a graduated cylinder. The mixture separated into separate layers. The upper layer is analyzed as hexane and the lower layer (5.2 ml.) is N,N-dimethyl beta-methoxypropionamide. Accordingly, it can be seen from this data that the solubility of N,N-dimethyl beta-methoxypropionamide is not very significant.

b. 5.0 ml. of a benzene-hexane mixture (4 ml. of hexane and 1 ml. of benzene) are mixed with 5 ml. of N,N-dimethyl beta-methoxypropionamide. The mixture is vigorously shaken and allowed to stand in a graduated cylinder. After standing, no distinct layer is observed, i.e., only a homogeneous solution is obtained by this mixture. Accordingly, N,N-dimethyl beta-methoxypropionamide alone is not an adequate composition by itself to extract aromatic hydrocarbons from a mixture of aromatic and aliphatic hydrocarbons.

c. 50.0 ml. of benzene-hexane solution (40.0 ml. of hexane and 10.0 ml. of benzene) is mixed with 50.0 ml. of a 95% (V/V) solution of N,N-dimethyl beta-methoxypropionamide and 5% $H_2O$. The mixture is shaken vigorously and allowed to stand. The mixture in the graduated cylinder immediately separates into two distinct layers. The upper layer is 38.0 ml. and the lower layer 62.0 ml. Analysis of the layers by gas chromatography (with the aid of a calibration curve) shows that the upper layer contains 30.2 ml. of hexane, 2.85 ml. of benzene, and the rest extractant, while the lower layer contains 9.6 ml. of hexane, 7.15 ml. of benzene and the remainder extractant. The selectivity for this extractant is where selectivity is defined as d. The extraction as described in paragraph (c) is repeated, using a 90% N,N-dimethyl beta-methoxypropionamide solution containing 10% water and a 5 ml. portion of a hexane-benzene mixture (3 ml. of hexane and 2 ml. of benzene). The graduated cylinder is shaken vigorously and the mixture immediately separates into two separate layers. The upper hexane layer (4.0 ml.) was analyzed to contain a predominant amount of hexane and the lower layer (6.0 ml.) was analyzed by gas chromatography to have N,N-dimethyl beta-methoxypropionamide and benzene. The analysis of the gas chromatography scans revealed that the N,N-dimethyl beta-methoxypropionamide had a selectivity of 4.4.

As it can be seen from the above data, the presence of a small amount of hydroxy-containing compound unexpectedly coacts with the N,N-dimethyl beta-methoxypropionamide to provide a superior selective extracting solvent for separating aromatic and aliphatic hydrocarbons. N,N-dimethyl beta-methoxypropionamide alone does not act as a selective extracting solvent. This is particularly surprising in view of the disclosure in U.S. Pat. No. 2,936,325 which discloses that the related compound, N,N-dimethyllactamide alone is an extracting solvent for separating aromatic and aliphatic hydrocarbons.

It has also been found that small amounts of lower alkanols such as methanol, ethanol, propanol or isopropanol with N,N-dialkyl beta-alkoxypropionamide and a small amount of water do not interfere with the extraction of aromatic hydrocarbons from a mixture containing aromatic and aliphatic hydrocarbons. In this connection, the alcohol by-product from the amidation reaction of the invention may be used, avoiding the necessity of removing the alcohol from the amide. However, N,N-dialkyl beta-alkoxypropionamide will not coact alone with other hydroxy containing compounds such as the aforementioned lower alkanols to extract aromatic hydrocarbons from hydrocarbon mixtures wherein a small amount of water is not present.

The amount of water represents a minor portion of the mixture. Generally speaking, amounts in the range up to about 20% V/V coact with the amide, preferably the water is present in amounts of less than 10% V/V.

It will be understood by those skilled in the art that various modifications of the present invention as described in the foregoing examples may be employed without departing from the scope of the invention. Many variations and modifications thereof will be apparent to those skilled in the art and can be made without departing from the spirit and scope of the invention herein described.

We claim:

$$\text{Selectivity} = \left[\frac{\text{Volume fraction of benzene}}{\text{Volume fraction of hexane}}\right] \text{in aromatic phase} \times \left[\frac{\text{Volume fraction of hexane}}{\text{Volume fraction of benzene}}\right] \text{in non-aromatic phase.}$$

1. A process for the production of an N,N-dialkylacrylamide, comprising:

a. amidating a beta-lower alkoxy substituted propionic acid ester with an amine having one labile hydrogen atom and substituted with two lower alkyl radicals having up to 6 carbon atoms, said amidation reaction being conducted by contacting said ester with said amine at temperatures ranging from about 75°C to about 100°C in the presence of a catalyst-solvent comprising a polyol having at least two vicinal hydroxy groups to form an alcohol and a beta-lower alkoxy substituted N,N-dialkypropionamide, b. catalytically cracking the beta-lower alkoxy substituted N,N-dialkylpropionamide by contacting the amide in the vapor phase at temperatures ranging from about 300°C to about 500°C with a particulate, acidic cracking catalyst, said catalyst being characterized as containing at least about 50%, by weight $SiO_2$ and a small but effective amount of $Al_2O_3$, to thereby form a mixture of an alcohol and the N,N-dialkylacrylamide, and recovering the latter.

2. The process of claim 1, wherein said polyol is a member selected from the group consisting of ethylene glycol, propylene glycol, glycerine, sorbitol and oligomers of the formula:

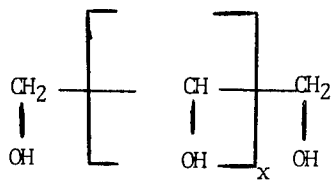

wherein $x$ is zero or a positive integer.

3. The process of claim 1, wherein said polyol is present in an amount ranging from about 0.1 mole to about 10 moles per mole of the ester.

4. The process of claim 1, wherein said cracking catalyst contains at least about 90%, by weight $SiO_2$ and from about 1% to about 5%, by weight $Al_2O_3$.

5. The process of claim 1, wherein said cracking catalyst is further characterized by having a surface area of from about 150 to about 200 $m^2/g$ and a particle size in the range of from about 4mm to about 5 mm.

6. The process of claim 1, wherein said catalytic cracking is conducted at temperatures ranging from about 350°C to about 425°C and at pressures ranging from about 100 mm to about 450 mm.

7. The process of claim 1, wherein the alcohols formed during said amidation and cracking reactions are separated from the amides by distillation.

8. The process of claim 1, wherein said beta-lower alkoxy substituted propionic acid ester is the methyl ester of beta-methoxypropionic acid, and the amine is dimethylamine.

9. An improved process for amidating a beta-lower alkoxy substituted propronic acid ester, comprising:
contacting under anhydrous conditions said ester with an amine having one labile hydrogen atom and substituted with two lower alkyl radicals having up to 6 carbon atoms, at temperatures ranging from about 75°C to about 100°C in the presence of a catalyst-solvent comprising a polyol having at least two vicinal hydroxy groups to form an alcohol and a beta-lower alkoxy substituted N,N-dialkylpropionamide, said polyol being present in an amount ranging from about 0.1 mole to about 10 moles per mole of the ester.

10. The process of claim 9, wherein said beta-lower alkoxy substituted propionic acid ester is the methyl ester of beta-methoxypropionic acid, said amine is dimethylamine and said polyol catalyst-solvent is glycerine.

11. An improved process for catalytically cracking a beta-lower alkoxy substituted N,N-dialkylpropionamide, comprising:
contacting said amide in the vapor phase at temperatures ranging from about 300°C to about 500°C with a particulate, acidic cracking catalyst, said catalyst being characterized as containing at least about 50%, by weight $SiO_2$ and a small but effective amount of $Al_2O_3$, said catalyst being further characterized as having a surface area of from about 150 to about 200 $m^2/g$ and a particle size in the range of from about 4 mm to about 5 mm. to form a mixture of an alcohol and an N,B-dialkylacrylamide.

12. The process of claim 11, wherein said cracking catalyst contains at least about 90%, by weight $SiO_2$ and from about 1% to about 5%, by weight $Al_2O_3$, and said catalytic cracking reaction is conducted at temperatures ranging from about 350°C to about 425°C and at pressures ranging from about 100 mm to about 450 mm.

13. A process for the production of N,N-dimethylacrylamide, comprising:
a. amidating under anhydrous conditions the methyl ester of beta-methoxypropionic acid with dimethylamine by contacting said ester with said amine at temperatures ranging from about 75°C to about 100°C in the presence of a catalyst-solvent comprising a polyol having at least two vicinal hydroxy groups, said polyol being a member selected from the group consisting of ethylene glycol, propylene glycol, glycerine, sorbitol and mixtures thereof, said polyol being present in an amount ranging from about 0.1 mole to about 10 moles per mole of the ester to form a mixture of methanol and N,N-dimethyl beta-methoxypropionamide, b. subjecting said mixture of methanol and N,N-dimethyl beta-methoxypropionamide to distillation to thereby obtain a substantially pure N,N-dimethyl beta-methoxypropionamide, c. catalytically cracking the N,N-dimethyl beta-methoxypropionamide by contacting the amide in the vapor phase at temperatures ranging from about 300°C to about 500°C with a particulate, acidic catalyst, said catalyst being characterized as containing at least about 50%, by weight $SiO_2$ and a small but effective amount of $Al_2O_3$, to thereby form a mixture of methanol and N,N-dimethylacrylamide, and d. subjecting the mixture of methanol and N,N-dimethylacrylamide to distillation to thereby obtain substantially pure, N,N-dimethylacrylamide.

14. The process of claim 13, wherein said polyol is glycerine.

15. The process of claim 13, wherein said catalyst contains at least about 90%, by weight $SiO_2$ and from about 1% to about 5%, by weight $Al_2O_3$.

16. The process of claim 13, wherein said catalytic cracking is conducted at temperatures ranging from about 350°C to about 425°C and at pressures ranging from about 100 mm to about 450 mm.

17. The process of claim 13, wherein said polyol is continuously recycled to said amidation reaction zone.

18. The process of claim 13, which includes the additional step of causing transesterification reaction to occur between said polyol and said methyl ester of the beta-methoxypropionic acid by heating said polyol and ester in the presence of an acid, and thereafter reacting the ester of the polyol with dimethylamine to form the N,N-dimethylamide of the beta-methoxypropionic acid.

19. A continuous process for the preparation of N,N-dimethylacrylamide, comprising:
   a. alkoxylating an alkyl acrylate by contacting said acrylate with methanol in the presence of a base to form an alkyl ester of beta-methoxy propionic acid.
   b. amidating under anhydrous conditions the alkyl ester of beta-methoxypropionic acid with dimethyl amine by contacting said ester with said amine at temperatures ranging from about 75°C to about 100°C in the presence of a catalyst-solvent comprising a polyol having at least two vicinal hydroxy groups, said polyol being a member selected from the group consisting of ethylene glycol, propylene glycol, glycerine, sorbitol and mixtures thereof, said polyol being present in the amount ranging from about 0.1 mole to about 10 moles per mole of the ester to form a mixture of alkanol and N,N-dimethyl beta-methoxypropionamide,
   c. subjecting the mixture of alkanol, N,N-dimethyl beta-methoxypropionamide and residual polyol to distillation to obtain a substantially pure N,N-dimethyl beta-methoxypropionamide,
   d. catalytically cracking the N,N-dimethyl beta-methoxypropionamide by contacting the amide in the vapor phase at temperatures ranging from about 300°C to about 500°C with a particulate, acidic cracking catalyst, said catalyst being characterized as containing at least about 50%, by weight $SiO_2$ and a small but effective amount of $Al_2O_3$, to thereby form a mixture of methanol and N,N-dimethylacrylamide,
   e. subjecting the mixture of methanol and N,N-dimethylacrylamide to distillation to thereby obtain substantially pure N,N-dimethylacrylamide, and
   f. recycling the alcohols obtained from said amidating and cracking reactions for use in said alkoxylation step and recycling said polyol from said amidation step for further use in said amidation step.

20. The process of claim 19, wherein said cracking catalyst contains at least about 90%, by weight $SiO_2$ and from about 1% to about 5%, by weight $Al_2O_3$.

21. The process of claim 19, wherein said catalytic cracking is conducted at temperatures ranging from about 350°C to about 425°C and at pressures ranging from about 100 mm to about 450 mm.

22. The process of claim 19, wherein said polyol is glycerine.

* * * * *